(12) United States Patent
Angerame

(10) Patent No.: US 12,261,435 B2
(45) Date of Patent: Mar. 25, 2025

(54) INTERNET OF THINGS (IOT) ENERGY DEVICE FOR RENEWABLE ENERGY-BASED MICRO-GRID INFRASTRUCTURE

(71) Applicant: Paul Victor Angerame, New York, NY (US)

(72) Inventor: Paul Victor Angerame, New York, NY (US)

( * ) Notice: Subject to any disclaimer, the term of this patent is extended or adjusted under 35 U.S.C. 154(b) by 499 days.

(21) Appl. No.: 17/570,129

(22) Filed: Jan. 6, 2022

(65) Prior Publication Data

US 2022/0216695 A1 Jul. 7, 2022

Related U.S. Application Data

(60) Provisional application No. 63/134,247, filed on Jan. 6, 2021.

(51) Int. Cl.
*H02J 3/00* (2006.01)
(52) U.S. Cl.
CPC .............. *H02J 3/004* (2020.01); *H02J 3/003* (2020.01); *H02J 2300/20* (2020.01)
(58) Field of Classification Search
CPC ......... H02J 3/004; H02J 3/003; H02J 2300/20
See application file for complete search history.

(56) References Cited

U.S. PATENT DOCUMENTS

| | | | | |
|---|---|---|---|---|
| 10,248,143 B2* | 4/2019 | Greene | ............. | G05D 23/1904 |
| 2014/0214213 A1* | 7/2014 | Rockenfeller | ........... | F24F 11/63 |
| | | | | 700/276 |
| 2016/0141873 A1* | 5/2016 | Ellice-Flint | ............... | H02J 3/32 |
| | | | | 307/20 |
| 2017/0358041 A1* | 12/2017 | Forbes, Jr. | ............... | G05D 3/12 |
| 2018/0041072 A1* | 2/2018 | Clifton | ...................... | H02J 3/32 |
| 2019/0081479 A1* | 3/2019 | Faley | ................ | H02J 13/00001 |
| 2021/0156926 A1* | 5/2021 | Knudson | ............... | G06F 1/3212 |
| 2022/0207578 A1* | 6/2022 | Misawa | .................. | B60L 58/12 |

OTHER PUBLICATIONS

ICT Monitor Worldwide, "Digital Catapult launches London network for IoT," Amman, Sep. 22, 2016.*
Abujubbeh, Mohammad, Power Loss Reduction and Voltage Profile Improvement Via Distributed PV Site and Size Selection in Smart Grids: The Case of North Cyprus, Middle East Technical University, Northern Cyprus Campus, Aug. 2019.*

* cited by examiner

*Primary Examiner* — Nathan Erb
(74) *Attorney, Agent, or Firm* — Barry Choobin; Patent 360

(57) ABSTRACT

A plug-and-play IoT energy device for pro-consumers of renewable energy and a method for managing renewable energy feed to a hybrid electricity grid infrastructure using an aggregator server connected to the IoT energy devices and the grid. The IoT energy devices can include a control unit, an inverter unit, an energy storage unit, and a network controller. The IoT energy devices can connect to the aggregator server through an external network such as Wi-Fi for managing renewable energy feed to the grid. The pro-consumers of the renewable energy are rewarded in digital currency tokens for feeding the grid with the renewable energy.

4 Claims, 3 Drawing Sheets

INTERNET OF THINGS (IOT) ENERGY DEVICE FOR RENEWABLE ENERGY-BASED MICRO-GRID INFRASTRUCTURE

CROSS-REFERENCE TO RELATED APPLICATIONS

This application claims priority from the U.S. provisional patent application Ser. No. 63/134,247 filed on Jan. 6, 2021, which is incorporated herein by reference in its entirety.

FIELD OF INVENTION

The present invention relates to an Internet of Things (IoT) energy device, and more particularly, the present invention relates to an IoT energy device for managing demand in a renewable energy-based micro-grid infrastructure.

BACKGROUND

The current United States electrical utility grid is in transition to a modern and smart grid. The major challenge to the existing infrastructure is the growing amount of renewable energy sources. Renewable energy sources are unstable, and the lack of management can cause serious grid imbalances. The original centralized design is outdated, aging, and in an urgent need of upgrade. The trend in the market has changed towards a decentralized model that uses Distributed Energy Resources. These include renewable energy suppliers like Solar, Wind, and Hydro. A global consensus now is that energy sources and energy consumptions should be as close as possible rather than the centralized grid model.

Balance of system equipment is available for pro-consumers of electricity that allows sending excess energy generated by the renewable energy sources to the grid. However, such equipment is costly, complex to install and manage, and are not sufficient to handle the increasing share of the renewable energy sources in the grid infrastructure.

Thus, an industrial need is appreciated for an improved pro-consumer device that allows better management of the micro-grids and a method for managing the energy infrastructure and incentivizing the consumers to adopt the renewable energy sources.

SUMMARY OF THE INVENTION

The following presents a simplified summary of one or more embodiments of the present invention in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments in a simplified form as a prelude to the more detailed description that is presented later.

The principal object of the present invention is therefore directed to an Internet of Things device and method of advanced management and two-way communication capabilities for a micro-grid.

It is another object of the present invention to incentivize the consumers to adopt renewable energy sources to power their homes, offices, and the like.

It is still another object of the present invention that the device is easy to install and manage.

It is a further object of the present invention that the device allows for mass adoption of renewable energy.

It is still a further object of the present invention that the installation and management can be made economical.

It is an additional object of the present invention that a need for costly centralization strategies can be obviated.

In one aspect, disclosed is a method for managing a hybrid electricity grid infrastructure based on fuel-based electricity and renewable energy feed from pro-consumers, the method comprising the steps of providing a plurality of IoT energy devices, wherein each IoT energy device includes a control unit configured to control a distribution of renewable energy stored in a storage unit to one or more energy loads and the hybrid electricity grid infrastructure, the control unit configured to connect to an aggregator server, an inverter unit for conversion of electrical energy between AC and DC, and a network controller for connecting to an external network, wherein the control unit connects to the aggregator server through the external network. The method further comprises the steps of connecting the plurality of IoT energy devices to the aggregator server through the external network, wherein the aggregator server is operably coupled to the hybrid electricity grid infrastructure; determining an on-time of each of the plurality of IoT energy devices for a pre-determined period, the on-time is a duration for which the respective IoT energy device can feed the renewable energy to the hybrid electricity grid infrastructure; and determining rewards in digital currency tokens for each of the plurality of IoT energy devices by the aggregator server based on the on-time.

In one implementation of the method, the external network is a Wi-Fi network or a LoRoWan network. The network controller is configured to connect for a two-way communication between the control unit and the aggregator server, wherein the method further comprises the steps of receiving, by the aggregator server, from the plurality of IoT energy devices, state of charge and readiness of the plurality of IoT energy devices; and transmitting instructions, by the aggregator server, to one or more of the plurality of IoT energy devices to offload the renewable energy to the hybrid electricity grid infrastructure. The method can further comprise the steps of determining, by the aggregator server, current energy demand and short-term projected energy demands of the hybrid electricity grid infrastructure; identifying, by the aggregator server, the one or more of the plurality of IoT energy devices based on the state of charge and the readiness; generating, by the aggregator server, the instructions based on the short-term projected energy demands.

In one implementation of the method, the each IoT energy device further comprises the storage unit, wherein the storage unit is a rechargeable battery. The one or more energy loads comprises household appliances.

In one aspect, disclosed is an IoT energy device for managing distribution of renewable energy generated from one or more renewable energy sources to one or more energy loads and an electricity grid infrastructure, the IoT energy device comprising: a control unit configured to control distribution of renewable energy stored in a storage unit to one or more energy loads and an electricity grid infrastructure, the control unit configured to connect to an aggregator server; an inverter unit for conversion of electrical energy between AC and DC; and a network controller for connecting to an external network, wherein the control unit connects to the aggregator server through the external network.

In one implementation of the IoT energy device, the external network is a Wi-Fi network or a LoRoWan network.

The network controller is configured to connect for a two-way communication between the control unit and the aggregator server, wherein the control unit is further configured to transmit details of state of charge of the storage unit and readiness of the IoT energy device to the aggregator server; and receive, from the aggregator server, instructions to offload the renewable energy in the storage unit to the electricity grid infrastructure. The control unit is configured to determine the state of charge of the storage unit and the readiness of the IoT energy device. The control unit is further configured to charge the storage unit with electricity received from the electricity grid infrastructure based on an instruction received from the aggregator server In one implementation of the IoT energy device, the IoT energy device further includes the storage unit. The storage unit is one or more rechargeable batteries. The one or more energy loads includes household appliances.

BRIEF DESCRIPTION OF THE DRAWINGS

The accompanying figures, which are incorporated herein, form part of the specification and illustrate embodiments of the present invention. Together with the description, the figures further explain the principles of the present invention and to enable a person skilled in the relevant arts to make and use the invention.

DETAILED DESCRIPTION

Figure 1:
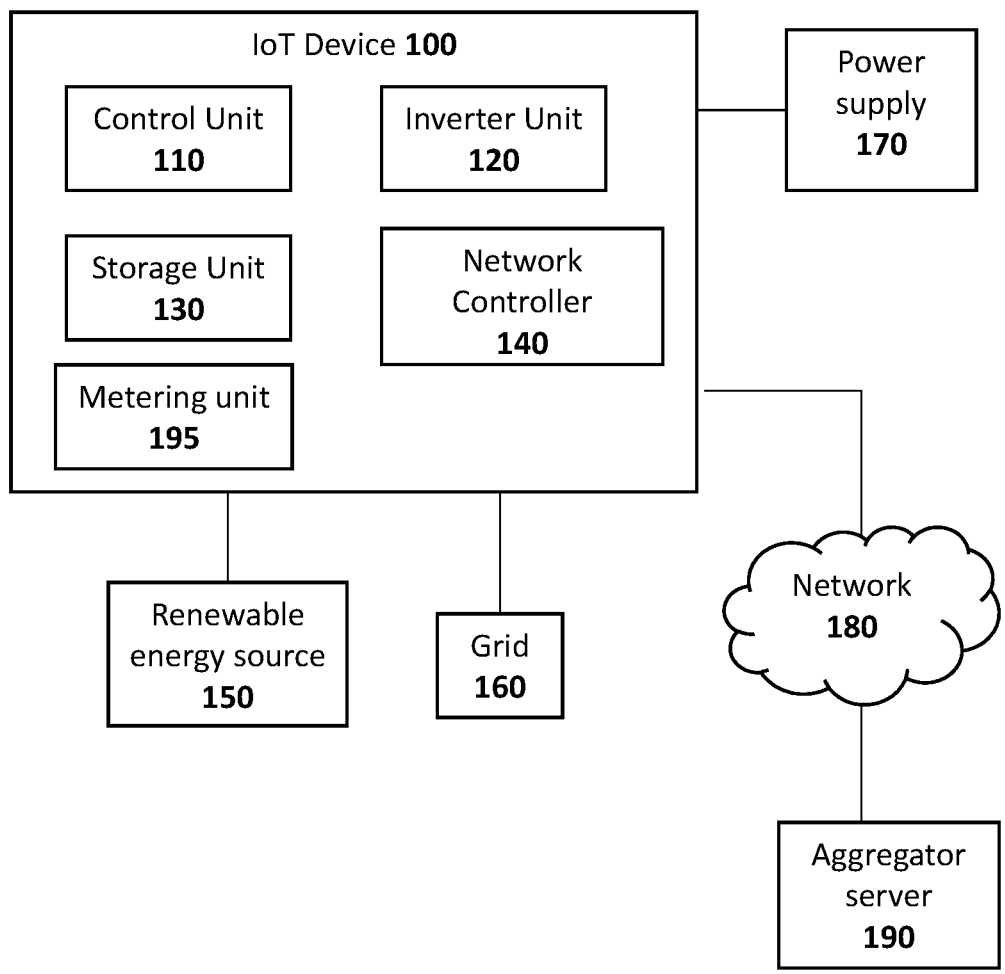
FIG. 1 is a block diagram showing an architecture of the disclosed IoT energy device, according to an exemplary embodiment of the present invention.
Figure 2:
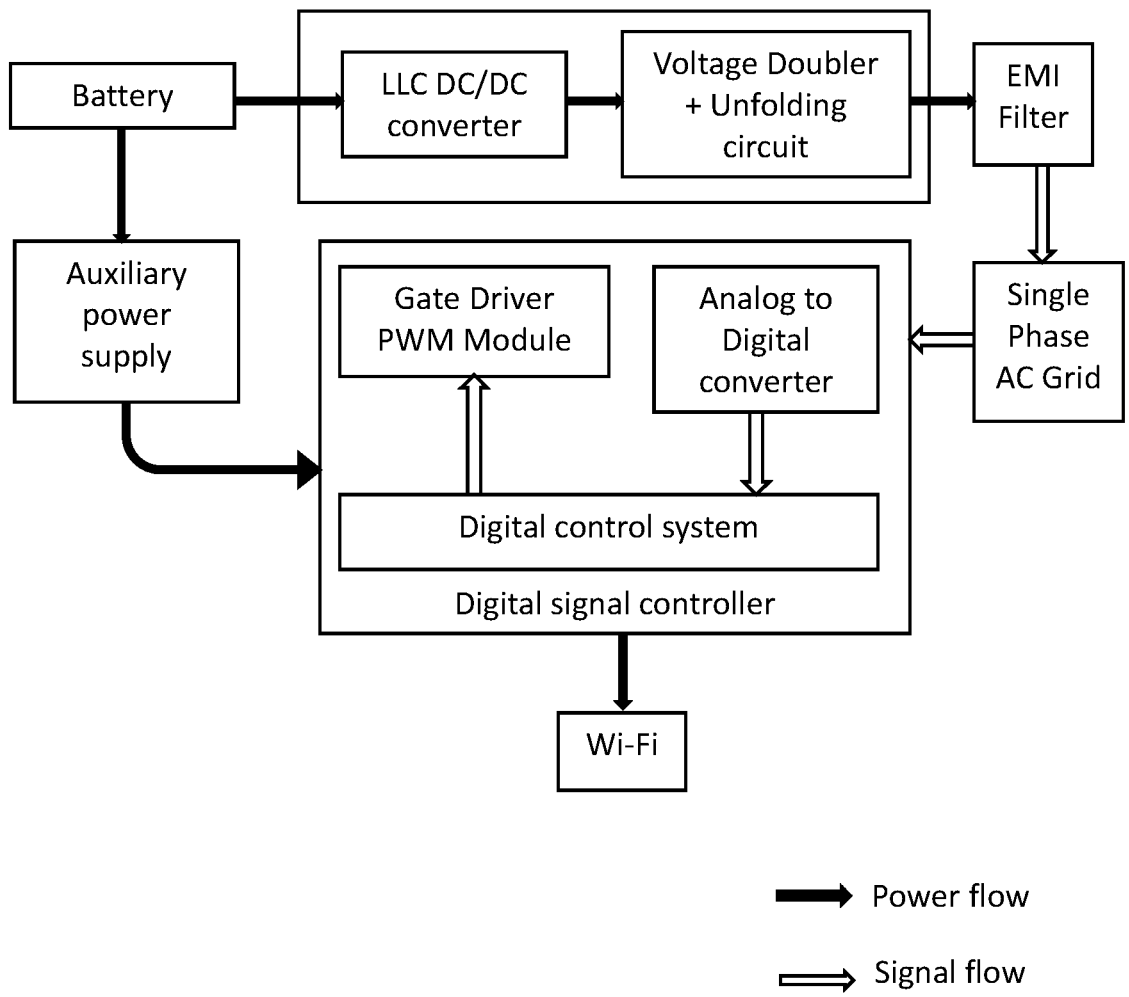
FIG. 2 is a block diagram showing the energy flow in the disclosed IoT energy device, according to an exemplary embodiment of the present invention.

Subject matter will now be described more fully hereinafter with reference to the accompanying drawings, which form a part hereof, and which show, by way of illustration, specific exemplary embodiments. Subject matter may, however, be embodied in a variety of different forms and, therefore, covered or claimed subject matter is intended to be construed as not being limited to any exemplary embodiments set forth herein; exemplary embodiments are provided merely to be illustrative. Likewise, the reasonably broad scope for claimed or covered subject matter is intended. Among other things, for example, the subject matter may be embodied as methods, devices, components, or systems. The following detailed description is, therefore, not intended to be taken in a limiting sense.

The word "exemplary" is used herein to mean "serving as an example, instance, or illustration." Any embodiment described herein as "exemplary" is not necessarily to be construed as preferred or advantageous over other embodiments. Likewise, the term "embodiments of the present invention" does not require that all embodiments of the invention include the discussed feature, advantage, or mode of operation.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

The following detailed description includes the best currently contemplated mode or modes of carrying out exemplary embodiments of the invention. The description is not to be taken in a limiting sense but is made merely for the purpose of illustrating the general principles of the invention, since the scope of the invention will be best defined by the allowed claims of any resulting patent.

Disclosed is an IoT energy device that can be a widely distributed electrical grid support product that allows for grid-strained demand support as well as provide for local resiliency for the end-users. The disclosed IoT energy device can provide for advanced management of the electricity grid infrastructure and allow more participation from the pro-consumers that can feed the grid with renewable energy. The disclosed IoT energy device can help maintain the stability of the grid while promoting the share of the renewable energy in the grid by the pro-consumers. Moreover, the disclosed IoT energy device can incentivize the consumers of electricity to adopt the disclosed IoT energy devices and contribute more renewable energy into the grid infrastructure. The disclosed IoT energy device can provide for mass adoption and aggregation on dispatchable energy devices across a vast geographic area. The disclosed IoT energy device can act as a personal appliance and not come with the installation costs of larger more centralized strategies. Each device can act as a distributed energy asset owned and spread throughout a community. The resultant energy network can provide resiliency to the host residence as well as strengthen the grid to the benefit of many. These distributed assets can be network aggregated and benefit the grid in the form of demand response, demand charge management, and energy arbitrage. The owners of these assets can leverage their position in the market by offloading hundreds of megawatts of power for extended periods of time and particularly in peak hours.

Referring to FIG. 1 which discloses a plug-and-play Internet of Things (IoT) energy device 100 that can be connected to renewable energy sources, such as solar, wind, hydro, and the like energy sources. It is understood that any renewable energy source can be used with the disclosed IoT energy device 100 and the renewable energy source can be of any capacity. Moreover, different types of renewably energy sources can also be combined, such as solar panels and wind turbines that can be connected to the IoT energy device 100. The renewable energy source 150 can be installed in a building or a field of the pro-consumer, and the disclosed IoT energy device 100 can be installed in the premises of the pro-consumer. The disclosed IoT energy device 100 can also be connected to a grid 160 for receiving electricity from the grid and transferring excess electricity to the grid. The grid can be a micro-grid or a local grid connecting several consumers of the electricity. A skilled person will appreciate that the disclosed device can be connected to any suitable grid without departing from the scope of the present invention. Also, the grid can connect both the consumers and pro-consumers of the electricity.

The IoT energy device 100 can connect to a power supply 170 through the plug-and-play mechanism. A user can simply plug the disclosed IoT energy device 100 into an electrical outlet, such as a standard 120 V electrical outlet. The power supply 170 can be connected to the load, such as electrical appliances in premises of the pro-consumer.

Figure 3:
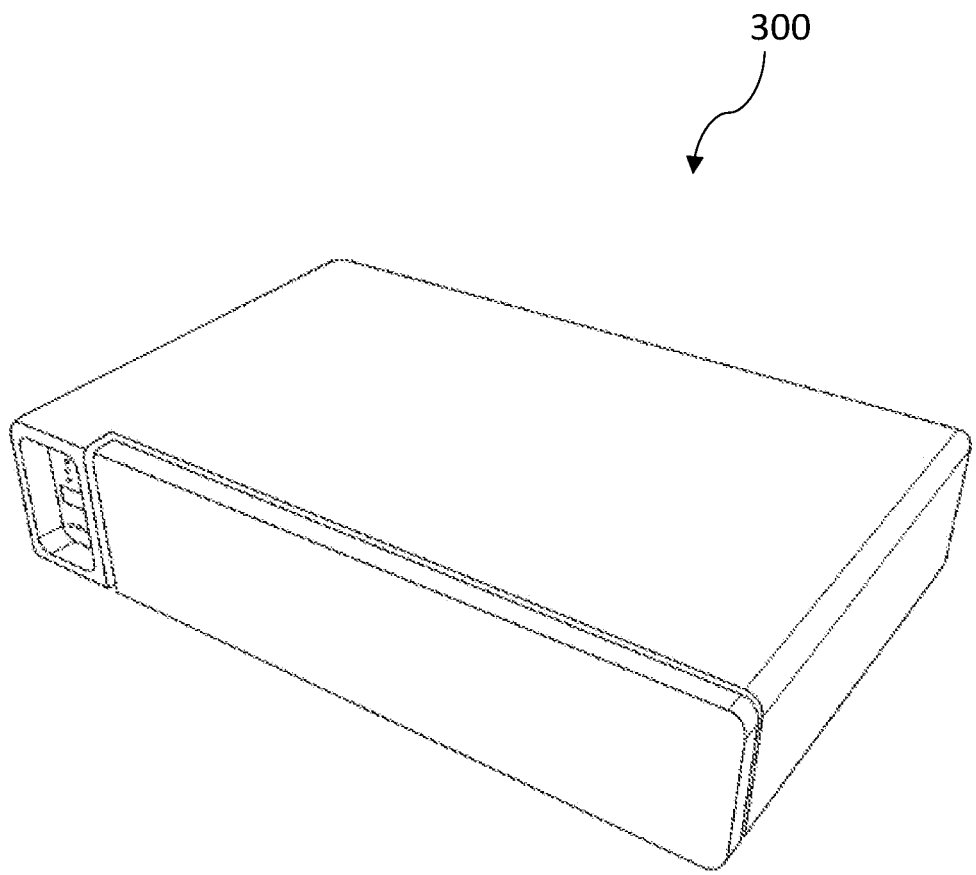
FIG. 3 shows a housing of the disclosed IoT energy device, according to an exemplary embodiment of the present invention.

The IoT energy device 100 can include a housing 300 shown in FIG. 3 that can be compact and portable. The IoT energy device 100 can include a control unit 110 that can control the operation of the disclosed IoT energy device 100. The control unit 110 can include a set of algorithms that can control the flow of electrical energy between the storage unit 130, the load connected to the power supply 170, and the grid 160 based on demand. Moreover, the control unit 110 can divert the flow of the electrical energy in near real-time to keep grid 160 stable and prevent both the overloading of the grid and the power outages.

The IoT energy device 100 can also include an inverter unit 120 that can provide for conversion between the AC and DC currents. The structure and functioning of the inverters are known in the art for power backup and for converting DC from the renewable energy source to AC. The storage unit 130 can be rechargeable batteries of a sufficient capacity, such as batteries of the capacity 1 kWh. It is understood that the batteries can be a separate unit from the IoT energy device 100, wherein the IoT energy device 100 can be connected to any available battery. For example, rechargeable batteries based on sodium and lithium-ion metal can be used. In one case, the battery can be provided by the pro-consumer, and the IoT energy device 100 can be connected to the battery.

The disclosed IoT energy device 100 can also include a network controller 140 that allows connecting the disclosed IoT energy device to an external network, such as a wired network, wireless network, or a combination of the wired network and wireless network. Suitable examples of network 180 include Wi-Fi or LoRoWan. It is understood, however, that any external network known to a skilled person for connecting two or more computing devices can be used without departing from the scope of the present invention.

The disclosed IoT energy device 100 can connect to an aggregator server 190, also disclosed herein as a preferred embodiment of the present invention, through the network 180 for two-way communication. The aggregator server 190 can send information to the IoT energy device 100 and can receive information from the aggregator server 190. The control unit 110 can determine the information including the state of charge and readiness of the IoT energy device 100. The information can be sent to the aggregator server 190 in near real-time or at pre-defined time intervals, or when the information is requested by the aggregator server 190. The aggregator server 190 can be connected to multiple IoT energy devices in a grid and can receive information related to the state of charge and readiness from the multiple IoT energy devices. The aggregator server 190 can also be connected to the grid and can determine the current demand and short-term projected energy demands in the grid. The aggregator server 190 using the information from the grid and the IoT energy devices, can instruct one or more IoT energy devices connected to the grid to offload stored electrical energy. The aggregator server 190 can help efficiently manage the storage and distribution of the electrical energy in the grid, wherein the IoT energy device can act as the scattered storage assets of the grid. The aggregator server 190 can prevent sudden or irregular renewable energy feed into the grid maintaining the stability and resilience of the grid both in regular hours and peak hours. Wastage of the electrical energy can be reduced or prevented by efficiently distributing the electrical energy between the grids and the IoT energy devices. The IoT energy devices can be strategically discharged to alleviate excessive grid demand, gain energy arbitrage, or maximize renewable energy production.

When these micro storage devices are aggregated by a third party, the host owners can be rewarded with cryptocurrency units for availability through a financial algorithm. FIG. 3 is a block diagram showing an exemplary embodiment of the power and signal flow in the disclosed IoT energy device.

The disclosed IoT energy device can also include a metering unit 195 that can track the amount of energy transferred to the grid from the IoT energy device 100 and the information can be transmitted to the aggregator server 190. The aggregator server 190 can compensate the pro-consumers with digital currency tokens, such as bitcoin. Alternatively, the pro-consumers can be compensated for the time they keep the IoT energy device online. Keeping the IoT energy device online during peak hours can be compensated at a premium price. The compensation in digital currency tokens can incentivize the consumer to adopt the disclosed IoT energy devices and connect to the disclosed aggregator server.

Moreover, utilizing blockchain security, accounting, and real-time nanosecond algorithms the disclosed distributed assets can work throughout day and night to produce revenue, protect the grid, promote renewable energy, and all the while protect the property of the resident in the event of a utility failure while producing units of value in the form of an attached cryptocurrency.

The IoT energy device and the aggregator server can be connected to a user device through the network. The user device can be any computing device, such as a desktop, laptop, smartphone, tablet computer, and the like. The user also referred to herein as the pro-consumer, can check the status of the disclosed IoT energy device on the user device through an interface implemented on the user device by the disclosed aggregator server. The interface can be an application software installed on the user device. The application software developed for Android™, iOS, and any other known operating platform for mobile devices. The application software can be made available through a distribution service provider, for example, Google Play™ operated and developed by Google, and the app store by Apple. In addition to the application software, a website-based interface can also be provided through the world-wide-web. The application software can also be provided for the desktop environment, such as Windows™, Linux, and macOS. The user interface may permit interacting with a user through the user device, wherein information can be presented within the interface by the aggregator server and the IoT energy device, and information can be received by the aggregator server and the IoT energy device from the user. The user can also connect their digital currency wallet to the application software for receiving the cryptocurrency from the aggregator server. Additionally, the user can control the preferences for offloading the stored energy by the IoT energy device to the grid through the application software.

Thus, the disclosed IoT energy devices and the aggregator servers can help solve the problems of unbalancing of the grids due to variable supply and demand for power. This disclosed micro storage, plug-and-play IoT energy devices can help manage the unpredictability of wind and solar energy production and peak energy demands. In addition, as utilities, businesses, and consumers bring more renewable energy online, the grid is expected to become harder to balance, wherein the disclosed distribution energy storage assets can keep the grid balanced and stable. With the rollout and adoption of disclosed micro storage plug and play devices, spinning reserves can be more tightly controlled thus reducing wasted capacity. This, combined with the ability to store power from intermittent solar and wind renewable sources, produces a robust clean energy outcome. This outcome can be modeled by valuing the availability of stored clean renewable energy and the mitigation of wasted capacity. The resultant reduction in emissions, in addition to the value in delaying or preventing the start-up of peak plant generators, creates significant and measurable environmental benefits. The aggregator server connected to a network of IoT energy devices can benefit the grid in the form of demand response, demand charge management, and energy arbitrage.

In certain embodiments, is disclosed an ultimate distributed energy resource. Emergency light packs and emergency light fixture power supplies that are networked together, aggregated, and available for resiliency and dispatch. Bringing energy storage to the fingers of the grid to stabilize and enhance performance. There are existing industry acceptance and jurisdictional building department requirements for emergency lighting. The disclosed device combines those requirements with a grid edge device that is the answer for distributed dispatch-able load relief for a variety of commercially valuable reasons. Those reasons include Demand Charge Management, Demand Response, Energy Arbitrage, Renewable Energy Time Shifting, Resiliency and emergency response. It is easy to deploy and can have a huge energy impact and significant value through existing Utility programs.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above-described embodiment, method, and examples, but by all embodiments and methods within the scope and spirit of the invention as claimed.

What is claimed is:

1. A method for managing a hybrid electricity grid infrastructure based on fuel-based electricity and renewable energy feed from pro-consumers, the method comprising the steps of:
    providing a plurality of IoT energy devices, each IoT energy device comprising:
        a control unit configured to control a distribution of renewable energy between a storage unit, one or more energy loads, and the hybrid electricity grid infrastructure based on demand, the control unit configured to connect to an aggregator server,
        an inverter unit for conversion of electrical energy between AC and DC, and
        a network controller for connecting to an external network, wherein the control unit connects to the aggregator server through the external network;
    connecting the plurality of IoT energy devices to the aggregator server through the external network, wherein the aggregator server is operably coupled to the hybrid electricity grid infrastructure;
    determining an on-time of each of the plurality of IoT energy devices for a pre-determined period, the on-time is a duration for which the respective IoT energy device can feed the renewable energy to the hybrid electricity grid infrastructure; and
    determining rewards in digital currency tokens for each of the plurality of IoT energy devices by the aggregator server based on the on-time;
    determining, by the aggregator server, current energy demand and short-term projected energy demands of the hybrid electricity grid infrastructure;
    identifying, by the aggregator server, the one or more of the plurality of IoT energy devices based on the state of charge and the readiness;
    generating, by the aggregator server, instructions based on the short-term projected energy demands, wherein the instructions are for offloading stored electrical energy from the one or more of the plurality of IoT energy devices to the grid; and
    permitting, through an interface, a user to control preferences for offloading the stored electrical energy by an IoT energy device to the grid,
    wherein the aggregator server is configured to prevent sudden or irregular renewable energy feed into a grid of the hybrid electricity grid infrastructure, maintaining the stability and resilience of the grid both in regular hours and peak hours, using the plurality of IoT energy devices as scattered storage assets, wherein the plurality of IoT energy devices are configured to be strategically discharged to alleviate excessive grid demand, gain energy arbitrage, and maximize renewable energy production,
    wherein the external network is a LoRaWAN network.

2. The method according to claim 1, wherein the network controller is configured to connect for a two-way communication between the control unit and the aggregator server, wherein the method further comprises the steps of:
    receiving, by the aggregator server, from the plurality of IoT energy devices, state of charge and readiness of the plurality of IoT energy devices; and
    transmitting instructions, by the aggregator server, to one or more of the plurality of IoT energy devices to offload the renewable energy to the hybrid electricity grid infrastructure.

3. The method according to claim 1, wherein the each IoT energy device further comprises the storage unit, wherein the storage unit is a rechargeable battery.

4. The method according to claim 1, wherein the one or more energy loads comprises household appliances.

* * * * *